United States Patent [19]

Ericksen

[11] Patent Number: 5,251,938
[45] Date of Patent: Oct. 12, 1993

[54] ADAPTER PIPE FITTING FOR SPRINKLER OR DRIP-TYPE IRRIGATION SYSTEMS

[75] Inventor: Kent C. Ericksen, Centerville, Utah
[73] Assignee: Pro-Mark, Inc., Bountiful, Utah
[21] Appl. No.: 752,845
[22] Filed: Aug. 30, 1991
[51] Int. Cl.⁵ .............................................. F16L 55/00
[52] U.S. Cl. ............................... 285/5; 285/92; 285/132; 285/150; 285/162; 285/179; 285/334.5; 285/921
[58] Field of Search ................ 285/5, 150, 162, 179, 285/192, 921, 92, 334.5, 132

[56] References Cited

U.S. PATENT DOCUMENTS

| | | | |
|---|---|---|---|
| 585,014 | 6/1897 | Wenzel et al. | 285/251 X |
| 928,237 | 7/1909 | Baird | 285/251 X |
| 3,003,792 | 10/1961 | Gilmour | 285/251 X |
| 3,032,358 | 5/1962 | Rolston | 285/251 X |
| 3,481,310 | 12/1969 | Alburger | 285/192 X |
| 3,973,732 | 8/1976 | Diggs | 285/5 X |
| 4,018,459 | 4/1977 | Mominee et al. | 285/5 |
| 4,128,264 | 12/1978 | Oldford | 285/921 X |
| 4,232,421 | 11/1980 | Tucker | 285/162 X |
| 4,597,597 | 7/1986 | Bloor et al. | 285/921 X |
| 4,603,888 | 8/1986 | Goodall et al. | 285/251 X |
| 4,676,438 | 6/1987 | Sesser | 285/921 X |
| 4,722,556 | 2/1988 | Todd | 285/177 X |
| 4,762,343 | 8/1988 | Hirohata | 285/921 X |
| 5,096,232 | 3/1992 | Fond et al. | 285/921 X |

FOREIGN PATENT DOCUMENTS 2211041  2/1973  Fed. Rep. of Germany ...... 285/162

Primary Examiner—Dennis L. Taylor
Assistant Examiner—Heather Chun
Attorney, Agent, or Firm—Mallinckrodt & Mallinckrodt

[57] ABSTRACT

Adapter pipe fittings for sprinkler or drip-type irrigation systems are improved by providing take-off fittings that snap into offtake connector members of the pipe body of such an adapter pipe fitting and swivels therein. The offtake portion of such a take-off swivel fitting preferably includes a screw threaded tip backed by a barb for enhancing holding of attached offtake tubing during the swivel action and for enabling selected take-off swivel fittings in manifold type units to be closed off by screwing plugs onto the threaded terminal ends thereof.

11 Claims, 2 Drawing Sheets

ADAPTER PIPE FITTING FOR SPRINKLER OR DRIP-TYPE IRRIGATION SYSTEMS

BACKGROUND OF THE INVENTION

1. Field

The invention is in the field of adapter pipe fittings as intended primarily for use in sprinkler or underground drip-type irrigation systems.

2. Prior Art

Adapter pipe fittings of the general type with which the invention is concerned are well known and commonly used in sprinkler and underground drip-type irrigation systems for gardens and lawns. They are often of manifold type having a plurality of offtakes at intervals along their lengths or circumferentially. As with pipe fittings in general, however, they are rigidly made to serve a particular purpose.

SUMMARY OF THE INVENTION

In the making of the present invention, it was a principal objective to improve existing adapter pipe fittings of the type concerned so that they would be almost universally applicable to a variety of use applications.

To this end, a novel feature of the invention is the provision of a rotable take-off fitting for the usual offtake from the body of an adapter pipe fitting of the type concerned, or for one or more and preferably all of the usual offtakes from the body of a manifold adapter pipe fitting of the type concerned, whereby interconnecting offtake tubing can be swiveled into any desired position to serve particular irrigating purposes.

A further novel feature is the provision of a combination threaded and barbed terminal end for the take-off swivel fitting connected to the body of an adapter pipe fitting of the type concerned, whereby swiveling of such take-off fitting is especially accommodate while offering connections of different types for selection if desired. Also, particular swivel fitting outlet in manifold type adapter pipe fittings may be closed off by screwing plugs onto the threaded terminal-ends thereof.

THE DRAWINGS

The best modes presently contemplated of carrying out the invention in actual practice are illustrated in the accompanying drawings wherein:

FIG. 1 is a perspective view of an adapter pipe fitting of the invention having a single take-off swivel fitting for use between an irrigating water supply line and a sprinkler head;

FIG. 2, an axial vertical section taken on the line 2—2 of FIG. 1;

FIG. 3, a view in elevation of an embodiment of the take-off swivel fitting of the invention that is shown with the adapter pipe fitting of FIGS. 1 and 2;

FIG. 4, a view corresponding to that of FIG. 1 but of the invention applied to a manifold type of adapter pipe fitting, with multiple take-off swivel fittings that are somewhat different from that of the foregoing FIGS.;

FIG. 5, a view corresponding to that of FIG. 2 but with respect to the adapter fitting of FIG. 4 as taken on the line 5—5 of FIG. 4;

FIG. 6, a view corresponding to that of FIG. 3 but showing the take-off swivel fitting of FIGS. 4 and 5;

FIG. 7, a view in elevation of a different type of basic adapter pipe fitting whose body accepts four take-off swivel fittings of either the type shown in FIG. 3 or in FIG. 6;

FIG. 8, an axial vertical section taken through the adapter pipe fitting of FIG. 7 on a plane coincident with the drawing sheet;

FIG. 9, a plan view taken with respect to the adapter pipe fitting of FIGS. 7 and 8 from the standpoint of the line 9—9 of FIG. 8; and FIG. 10, a plan view taken with respect to the adapter pipe fitting of FIGS. 7 and 8 from the standpoint of the line 10—10 of FIG. 7.

DETAILED DESCRIPTION OF THE ILLUSTRATED EMBODIMENTS

Figure 1:
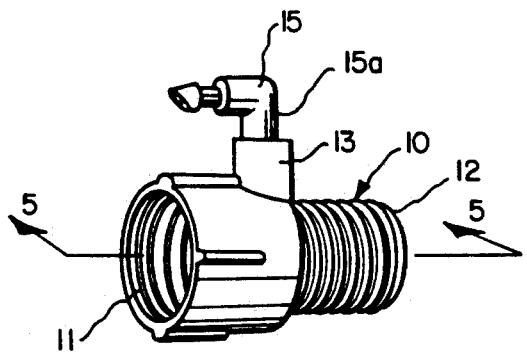
Figure 2:
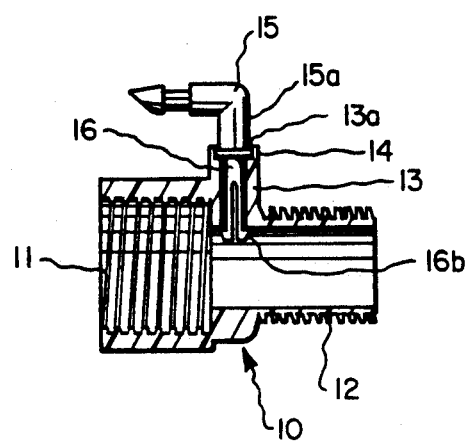

The adapter pipe fitting of FIGS. 1 and 2 is of substantially conventional formation, its body 10 having an internally threaded socket end for flow connection with a source of pressure irrigation water and an externally threaded end 12 adapted to have a usual sprinkler head (not shown) screwed thereonto. An offtake connector member 13 projects in customary manner at right angles from the body 10 of such adapter pipe fitting.

Offtake connector member 13 is unique in that its outer terminal end is reentrant, as at 13a, FIG. 2, to provide an entryway of sufficiently greater diameter than the inside diameter of the flow passage through offtake connector member 13 to accommodate an O-ring 14 applied, if desired (as is preferable), to take-off swivel fitting 15 that is snapped into such offtake connector member 13. Also unique is the fact that such take-off swivel fitting 15 is constructed to snap into place and to swivel after placement whether or not O-ring 14 is used.

Take-off swivel fitting 15 as here shown is of elbow configuration, having an elongate snap-in end portion 16 of reduced diameter extending from a larger diameter branch 15a of the elbow, whereby a seat for receiving the O-ring 14 is provided on the snap-in end portion or stem 16 at the shouldered end of such elbow branch 15a.

The snap-in end portion or stem 16 of take-off swivel fitting 15 is of cylindrical configuration, split longitudinally as at 16a, with a flange 16b at its terminal end to engage the circumferential margin of the inner diameter surface of pipe portion 10 surrounding the opening into pipe portion 10 of the interior flow passage of the offtake connection member 13. The material from which take-off swivel fitting 15 is made is sufficiently resilient, usually a suitable polymer plastic material, to yield as the flanged terminal or head end 16c of such stem 16 is pushed into place through the interior flow passage of the offtake connector member 13. To facilitate entry into and passage of such flanged head end of split stem 16 through the interior flow passage of off-take connector member 13, such head end is preferably tapered as illustrated.

Figure 3:
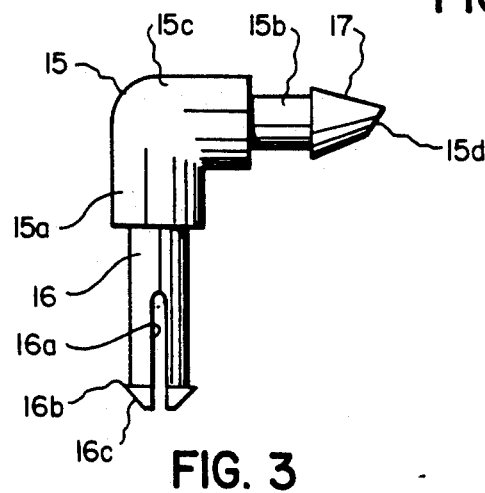
Figure 7:
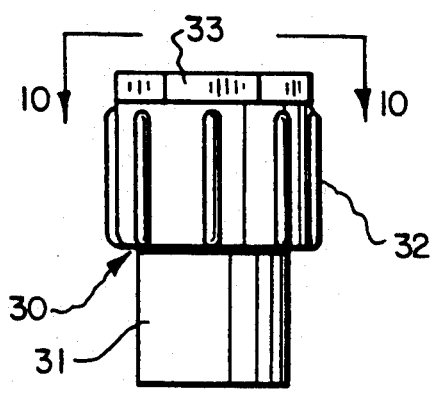
Figure 10:
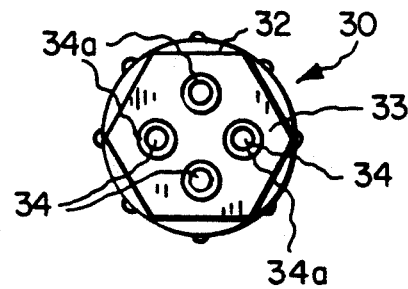
Figure 9:
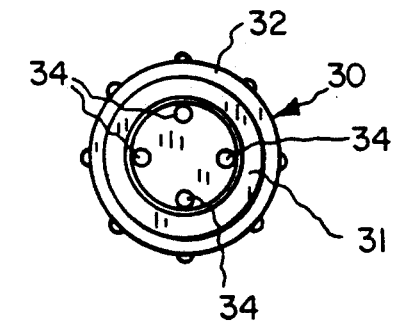

The opposite end portion 15b, FIG. 3, of take-off swivel fitting 15, as shown for this embodiment extends from the other elbow branch 15c of such take-off swivel fitting 15 and terminates in the usual beveled outlet tip 15d having a barb 17 providing connection for flexible offtake tubing (not shown) leading to a usual drip type or other irrigating outlet for the irrigating system concerned, it being realized that the swivel connection to the basic system provides for universal use applications in the system.

Figure 4:
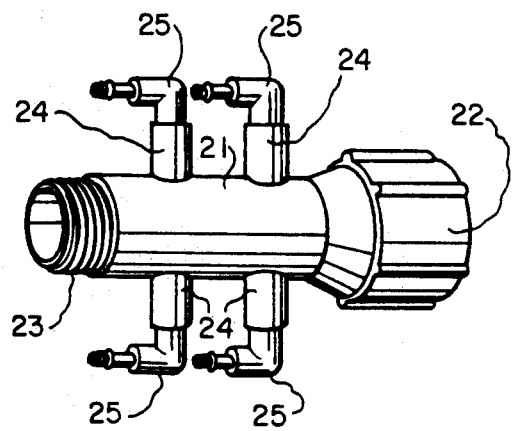
Figure 5:
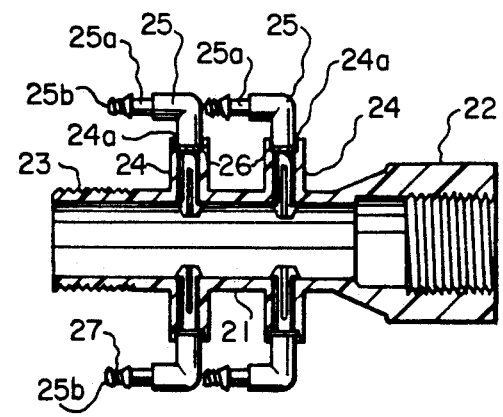

The embodiment of FIGS. 4 and 5 show how the invention is applied to a manifold adapter pipe fitting 20 whose body has an elongate pipe portion 21 for flow of pressure irrigation water from an internally threaded socket end 22 to an externally threaded end 23 adapted to have a usual sprinkler head (not shown) screwed thereonto. A plurality, here four, of offtake connector members 24, respectively, project in customary manner at right angles from, as shown, at opposite sides of pipe portion 21. Otherwise, the reentrant formations 24a of offtake connector members 24 and the general formation of take-off swivel fittings 25, respectively, and their snap-fitting into the offset connector members 24 of manifold adapter pipe fitting 20, together with respective O-rings 26, are as previously explained for the embodiment of FIGS. 1 and 2.

Figure 6:
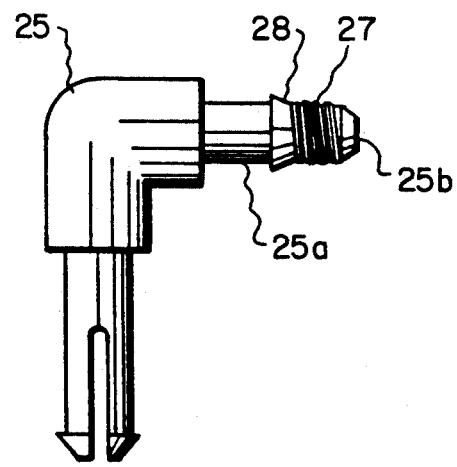

As an optional but particularly advantageous feature of the present invention, in this embodiment the take-off swivel fittings 25 differ from such fitting 15 of the previous embodiment (as shown per se in FIG. 3) in that (as shown per se in FIG. 6) the outlet end portions 25a thereof have their outlet tips 25b externally threaded, as at 27, as well as provided with a barb 28, whereby retention of flexible offtake tubing (not shown) connected thereto is enhanced to withstand pulling or other forced movement of such tubing during swiveling action of the take-off swivel fitting 25 to which it is attached, or, as previously indicated, close-off plugs (not shown) may be screwed thereinto.

It should be realized that the novel features of the invention may be applied to a variety of adapter pipe fittings, since there are many different possibilities.

Figure 8:
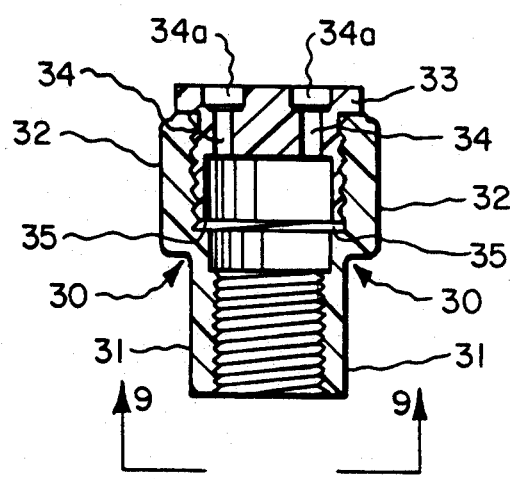

For example, the embodiment of FIGS. 7-10 comprises a different manifold adapter pipe fitting whose body 30 has an internally threaded end 31, FIG. 8, for screwing onto a water supply line and an opposite, internally threaded end 32 into which is screwed an auxiliary outlet fitting 33 having therein multiple (here four) offtake connector members in the form of undivided portions of such fitting 33 with flow passages 34, respectively, that are each reentrant, as at 34a, for receiving the stem of an offtake swivel fitting. Such swivel fitting may be as illustrated in either FIG. 3 or FIG. 6, but is preferably the latter.

As here illustrated, a screen 35, FIG. 8, is interposed between adapter pipe fitting body 30 and screw-in auxiliary outlet fitting 33 for the usual purpose of screening out solids that might inhibit free flow of water through the system. With the take-off swivel fittings snap-fitted into such auxiliary outlet fitting 33, and the latter screwed into adapter fitting body 30, such auxiliary outlet fitting 33 may be easily unscrewed for removal and cleaning of the screen when required after disconnecting the lead-off tubings (not shown) from the take-off swivel fittings.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An adapter pipe fitting for sprinkler or drip-type irrigation systems, comprising an adapter pipe body with a flow channel therethrough and having at least one offtake connector member with flow passage therethrough communicating with said flow channel, said offtake connector member or members each having a reentrant outlet end; a take-off swivel fitting snapped into each offtake connector member through said outlet end for swivel action therein, said take-off fitting having an elongate, resilient, snap-in portion at one end thereof of reduced outside diameter such as to be rotatably received by the flow passage through said offtake connector member, said snap-in portion being split longitudinally and having a headed end for engaging the inside surface of said adapter pipe body marginal to said flow passage when said snap-in portion is snapped into place, a greater diameter portion of said take-off fitting immediately adjacent to said elongate snap-in portion being rotatably received by said reentrant outlet end of said offtake connector member so as to swivel therein, the take-off swivel fitting having an opposite end portion terminating in a barbed outlet tip providing connection for flexible offtake tubing, and the barbed outlet tip having its tip end screw threaded and backed by a barb.

2. An adapter pipe fitting according to claim 1, wherein an O-ring is fitted onto the reduced diameter snap-in portion of the take-off swivel fitting at the junction thereof with the adjoining larger diameter portion of such swivel fitting so as to fit within the reentrant outlet portion of the offtake connector member.

3. An adapter pipe fitting according to claim 1, wherein the adapter pipe body fitting is of manifold type having a plurality of offtake connector members and a corresponding plurality of take-off swivel fittings snapped thereonto.

4. An adapter pipe fitting according to claim 1, wherein the take-off swivel fitting is of elbow formation between its snap-in portion and its outlet tip portion.

5. An adapter pipe fitting for sprinkler or drip-type irrigation systems, comprising an adapter pipe body with a flow channel therethrough and having at least one offtake connector member with flow passage therethrough communicating with said flow channel, said offtake connector member or members each having a reentrant outlet end; a take-off swivel fitting snapped into each offtake connector member through said outlet end for swivel action therein, said take-off fitting having an elongate, resilient, snap-in portion at one end thereof of reduced outside diameter such as to be rotatably received by the flow passage through said offtake connector member, said snap-in portion being split longitudinally and having a headed end for engaging the inside surface of said adapter pipe body marginal to said flow passage when said snap-in portion is snapped into place, a greater diameter portion of said take-off fitting immediately adjacent to said elongate snap-in portion being rotatably received by said reentrant outlet end of said offtake connector member so as to swivel therein, the adapter pipe body having an internally threaded outlet end; an auxiliary outlet fitting screwed into said outlet end; and the at least one offtake connector member extending through said auxiliary outlet fitting from end-to-end thereof.

6. An adapter pipe fitting according to claim 5, wherein the take-off swivel fitting has an opposite end portion terminating in a barbed outlet tip providing connection for flexible offtake tubing.

7. An adapter pipe fitting according to claim 6, wherein the barbed outlet tip has its tip end screw threaded and backed by a barb.

8. An adapter pipe fitting according to claim 7, wherein the take-off swivel fitting is of elbow formation between its snap-in portion and its outlet tip portion.

9. An adapter pipe fitting according to claim 5, wherein a screen is interposed between the adapter pipe body and the auxiliary outlet fitting.

10. An adapter pipe fitting according to claim 5, wherein the adapter pipe fitting is of manifold type, there being a plurality of offtake connection members in the auxiliary outlet fitting and a corresponding plurality of take-off swivel fittings snapped thereinto.

11. An adapter pipe fitting according to claim 5, wherein an O-ring is fitted onto the reduced diameter snap-in portion of the take-off swivel fitting at the junction thereof with the adjoining larger diameter portion of such swivel fitting so as to fit within the reentrant outlet portion of the offtake connector member.

* * * * *